M7843 OR AI 105 D SPECIFICATION AVAILABLE.
E. S. SNYDER.
Thrashing Machine.
~~No.~~ 105.
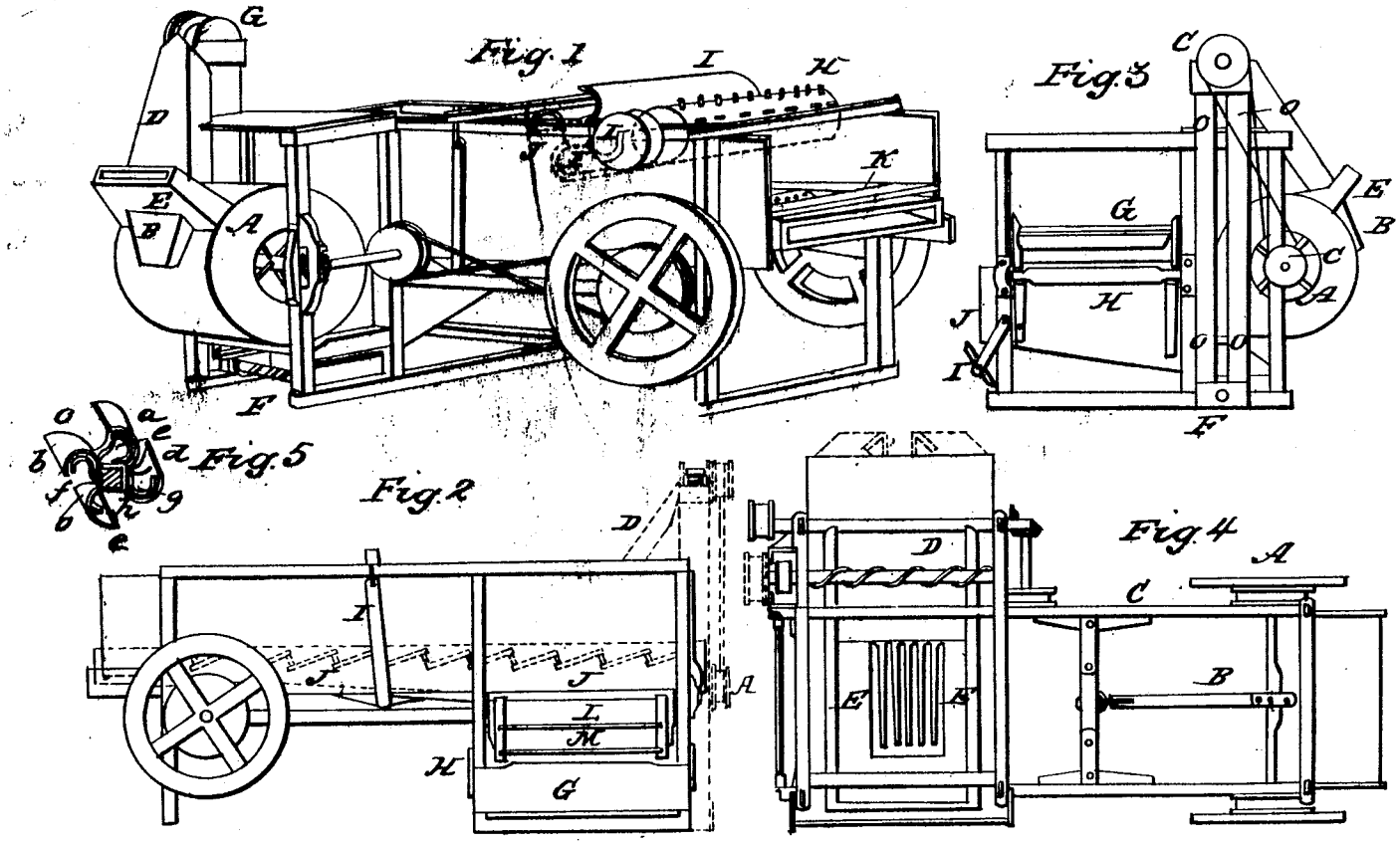
A. I. Patented Aug. 23, 1853.